(12) United States Patent
Lee

(10) Patent No.: US 11,873,965 B2
(45) Date of Patent: Jan. 16, 2024

(54) VEHICULAR LAMP CAPABLE OF DEHUMIDIFICATION

(71) Applicant: WOOSUNGPOWERTECH CO., LTD., Daegu-si (KR)

(72) Inventor: Min Ho Lee, Daegu (KR)

(73) Assignee: WOOSUNGPOWERTECH CO., LTD., Daegu-si (KR)

( * ) Notice: Subject to any disclaimer, the term of this patent is extended or adjusted under 35 U.S.C. 154(b) by 0 days.

(21) Appl. No.: 18/043,347

(22) PCT Filed: Feb. 24, 2021

(86) PCT No.: PCT/KR2021/002306
§ 371 (c)(1),
(2) Date: Feb. 28, 2023

(87) PCT Pub. No.: WO2022/045500
PCT Pub. Date: Mar. 3, 2022

(65) Prior Publication Data
US 2023/0341104 A1    Oct. 26, 2023

(30) Foreign Application Priority Data

Aug. 28, 2020  (KR) .................. 10-2020-0109636
Dec. 21, 2020  (KR) .................. 10-2020-0180074

(51) Int. Cl.
*F21S 45/33* (2018.01)
*F25B 21/04* (2006.01)
*F21S 41/20* (2018.01)

(52) U.S. Cl.
CPC ............... *F21S 45/33* (2018.01); *F21S 41/28* (2018.01); *F25B 21/04* (2013.01); *F25B 2321/0212* (2013.01); *F25B 2321/0251* (2013.01)

(58) Field of Classification Search
CPC .................................. F21S 45/33; F21S 41/28
See application file for complete search history.

(56) References Cited

U.S. PATENT DOCUMENTS

2011/0242833 A1* 10/2011 Tominaga ............. F21S 41/148
                                                                362/539
2016/0348870 A1* 12/2016 Kim ........................ F21S 45/60
(Continued)

FOREIGN PATENT DOCUMENTS

JP    2009-021245 A    1/2009
JP    2010-170905 A    8/2010
(Continued)

*Primary Examiner* — Evan P Dzierzynski
(74) *Attorney, Agent, or Firm* — NKL Law; Jae Youn Kim

(57) ABSTRACT

Disclosed is a vehicular lamp. This vehicular lamp comprises: a light source; glass disposed in front of the light source; a housing supporting the light source and the glass and forming the exterior; a thermoelectric element unit which generates cold wind and warm wind by introducing air outside the housing into the housing; a first flow path through which one of the cold wind or the warm wind generated in the thermoelectric element unit flows into the housing; and a second flow path through which the other one of the cold wind or the warm wind is discharged outside the housing. The thermoelectric element includes: a first part connected to the first flow path and generating one of cold air or warm air; a second part connected to the second flow path and generating the other one of the cold air or the warm air; a body part which partitions arrange spaces for the first part and the second part and has an opening formed in the bottom surface; a first fan which is disposed in the opening of the body part and generates an inflow of air from the lower side to the upper side; and a second fan which is disposed inside the housing and circulates the air that has flowed into the first flow path.

9 Claims, 6 Drawing Sheets

(56) References Cited

U.S. PATENT DOCUMENTS

| | | | |
|---|---|---|---|
| 2018/0106457 A1* | 4/2018 | Jauernig | F21S 45/30 |
| 2019/0376660 A1* | 12/2019 | Menn | F21S 45/43 |
| 2021/0270442 A1* | 9/2021 | Kim | F21S 45/435 |

FOREIGN PATENT DOCUMENTS

| | | | |
|---|---|---|---|
| JP | 2017-228417 A | 12/2017 |
| KR | 10-2016-0122014 A | 10/2016 |
| KR | 10-2018-0000550 A | 1/2018 |
| KR | 102171171 B1 | 10/2020 |

* cited by examiner

VEHICULAR LAMP CAPABLE OF DEHUMIDIFICATION

TECHNICAL FIELD

The present disclosure relates to a vehicular lamp, hand to a vehicular lamp capable of dehumidifying the inside of the lamp using a thermoelectric element unit.

BACKGROUND ART

In vehicles, various types of lamps such as a headlamp, a rear lamp, a side lamp, and the like are used. In such a vehicular lamp, condensation may occur due to a difference in temperature and humidity between the inside and outside of the vehicular lamp. If the condensation appears on a light source and a glass installed in the vehicular lamp, the condensation reduces lighting efficiency of the light source, makes it difficult to ensure visibility, and reduces the life of the light source. Accordingly, a device for effectively removing moisture in the vehicular lamp is required.

DISCLOSURE

Technical Problem

Thus, in order to solve the problems described above, an objective of the present disclosure is to provide a vehicular lamp having a function of removing moisture in a housing of the vehicular lamp by driving a thermoelectric element and using flow paths.

Technical Solution

A vehicular lamp according to the present disclosure includes: a light source; a glass disposed ahead of the light source; a housing configured to support the light source and the glass and form an appearance; a thermoelectric element unit disposed at a lower end of an external rear surface of the housing and configured to generate cold wind and hot wind by introducing external air of the housing; a first flow path introducing one of the cold wind and the hot wind generated by the thermoelectric element unit into the housing; and a second flow path discharging the other one of the cold wind and the hot wind to outside of the housing, and the thermoelectric element unit includes: a first part connected to the first flow path and generating one of cold air and hot air; a second part connected to the second flow path and generating the other one of the cold air and the hot air; a body part dividing a space where the first part and the second part are disposed and having an opening formed in a bottom surface thereof; and a first fan disposed at the opening of the body part and introducing air in a direction from a lower portion to an upper portion, and a second fan disposed inside the housing and causing circulation of the air introduced into the first flow path is further provided.

In this case, the second part may be disposed below the first part, the first fan is disposed in parallel with the bottom surface of the body part, and the body part may guide air introduced from an opening into the first part.

Meanwhile, an air blowing port disposed at an upper end of the rear surface of the housing may be included.

Meanwhile, a fan housing disposed at a front side of a bottom surface of the housing to support the second fan may be further included.

In this case, the fan housing may suck in air through a first opening formed in a direction toward a rear surface, and discharge air through a second opening formed in a direction toward a front surface.

Meanwhile, the fan housing sucks in air through a first opening formed in a direction toward a rear surface and discharges air through a second opening formed in a direction toward a upper surface.

Meanwhile, a reflector for reflecting light of the light source toward the glass in the housing may be further included, and an inlet for discharging air from the first flow path into the housing may be disposed ahead of the reflector.

Meanwhile, there may be included: a sensor comprising an internal sensing part configured to sense at least one of temperature and humidity in the housing, and a controller configured to control a polarity of an electric signal provided to the thermoelectric element unit based on a result of detection by the sensor.

In this case, a sensor may include an external sensing part configured to obtain at least one of external temperature and external humidity of the housing, and the controller may be configured to control an operation of the thermoelectric element unit by comparing a detection result of the internal sensing part and an obtained result of the external sensing part.

In this case, the sensor may be disposed at an external rear surface of the housing.

In this case, the controller may be configured to receive at least one information on external temperature and external humidity from a processor of a vehicle with the vehicular lamp mounted thereon, and to control an operation of the thermoelectric element unit by comparing with the detection result of the sensor.

Meanwhile, the first flow path may have a shape of a cross-sectional area increasing in a direction toward the glass so that one of the cold wind and the hot wind circulates by convection in the housing along an inner side surface of the glass.

In this case, the second flow path may be formed to discharge the other one of the cold wind and the hot wind to a direction external to the glass.

Meanwhile, the second flow path may be formed to discharge the other one of the cold wind and the hot wind to a direction toward the rear surface of the housing.

Meanwhile, the thermoelectric element unit may include a plurality of pins that come into contact with the first part and the second part.

Meanwhile, the thermoelectric element unit may include an insulation material disposed at side surfaces of the first part and the second part.

Advantageous Effects

A vehicular lamp according to various embodiments of the present disclosure may effectively remove moisture in the vehicular lamp by using a thermoelectric element unit and flow paths.

MODE FOR DISCLOSURE

Figure 1:
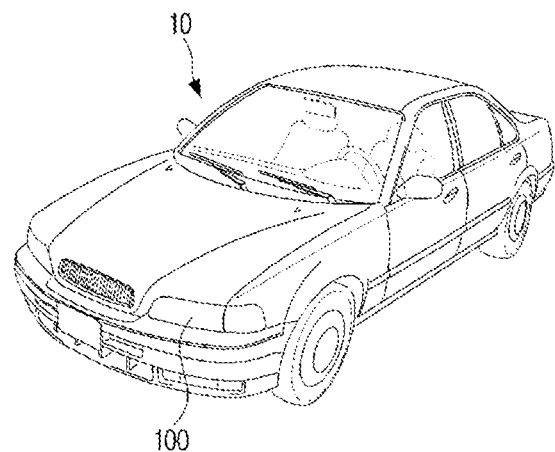
FIG. 1 is a perspective view showing a state in which a vehicular lamp according to an embodiment of the present disclosure is disposed at a front end portion of a vehicle.

After terms used in the specification are briefly described, the present disclosure will be described in detail.

General terms that are currently widely used are selected as terms used in embodiments of the present disclosure in consideration of functions in the present disclosure, but may vary depending on the intention of those skilled in the art or a judicial precedent, an emergence of a new technique, and the like. In addition, in certain cases, some terms are arbitrarily selected by the applicant, and in such cases, meanings of the terms will be described in detail in the corresponding description of the present disclosure. Therefore, the terms used in the present disclosure should be defined on the basis of the meaning of the terms and the contents throughout the present disclosure rather than simple names of the terms.

Embodiments of the present disclosure may apply various modifications and have various embodiments, and specific embodiments will be illustrated in the drawings and described in detail in the detail description. However, this is not intended to limit the scope to the specific embodiment, and it should be understood to include all modifications, equivalents, and substitutes included in the scope of the disclosed spirit and technology. In describing the embodiments, when it is determined that the detailed description of the related known technology may obscure the gist, the detailed description thereof will be omitted.

Terms such as first and second may be used to describe various components, but the components should not be limited by the terms. The terms are used only to distinguish one component from other.

Singular expressions include plural expressions unless the context clearly dictates otherwise. In this application, it should be understood that the term "include" or "constituted" used in the application specifies the presence of features, numerals, steps, operations, components, parts mentioned in the specification, or combinations thereof, but do not preclude the presence or addition of one or more other features, numerals, steps, operations, components, parts, or combinations thereof.

In the following embodiments, the term such as "unit" and "part" indicates a unit for processing at least one function or operation, and this may be implemented by hardware, software, or a combination thereof. In addition, a plurality of "units" or "parts" may be integrated as at least one unit and implemented as at least one processor except for a "unit" or "part" needed to be implemented as specific hardware.

Hereinafter, embodiments of the present disclosure will be described in detail with reference to the accompanying drawings so that those skilled in the art to which the present disclosure pertains may easily practice the present disclosure. However, the present disclosure may be implemented in various different forms and is not limited to the embodiments described herein. In addition, in the drawings, portions unrelated to the description will be omitted to obviously describe the present disclosure, and similar portions will be denoted by similar reference numerals throughout the specification.

Hereinafter, the present disclosure will be described in more detail with reference to the drawings.

FIG. 1 is a perspective view showing a state in which a vehicular lamp 100 according to an embodiment of the present disclosure is disposed at a front of a vehicle 10.

Referring to FIG. 1, a vehicular lamp 100 according to an embodiment of the present disclosure may be installed at a front end portion of a vehicle 10. Such a vehicle includes all types of vehicles such as passenger cars, two-wheeled vehicles, and trucks.

In addition, the vehicular lamp 100 according to the present disclosure may be disposed, not only as a headlight and a high beam on the front end portion, but also on a rear side of the vehicle 10, and various lighting devices such as a fog lamp, a winker, and the like may be used.

In addition, the vehicular lamp 100 of the present disclosure may be used in a range expanded to a train, a ship, and an airplane, and may be applied to illumination equipment, which is not vehicle but is provided with a lamp such as household illumination, industrial illumination, stage illumination, local illumination, and street lamp, and aspects of the present disclosure are not limited to the above examples.

However, for convenience of explanation, in this embodiment, an example applied to a headlamp of a four-wheeled vehicle will be described.

The vehicle 10 provides power to the vehicular lamp 100. Specifically, the vehicle 10 may generate electric energy using power of an engine and charge the generated power energy to a secondary battery. In addition, the vehicle 10 may provide the vehicular lamp 100 with the power charged in the secondary battery. Meanwhile, in a case where the vehicle 10 is driven only by electric power, the secondary battery may be charged with power provided by a household adapter or an electric charging station.

In addition, the vehicle 10 may control the vehicular lamp 100 so that the vehicular lamp 100 emits light upon a user's manipulation or occurrence of a preset condition. For example, when the intensity of illumination outside the vehicle 10 is equal to or less than a predetermined intensity, 'the vehicle 10 may control the vehicular lamp 100 to emit light without a user's manipulation. The specific electrical configuration of the vehicle 10 will be described with reference to FIG. 2.

The vehicular lamp 100 emits light to an area ahead of the vehicle 10. Specifically, the vehicular lamp 100 is provided with a light source 110 for emitting light, and may emit light under the control of the vehicle 10.

Further, when the internal temperature or humidity of the vehicular lamp 100 reaches a preset level, the humidity may be reduced using the thermoelectric element unit 130. Such a function may be performed according to the control of a central control device mounted on the electric field of the vehicle 10 but may also be autonomously performed by the vehicular lamp 100 without association.

The specific configuration of the vehicular lamp 100 will be described later with reference to FIGS. 3 to 11.

As such, the vehicle 10 of the present disclosure uses the vehicular lamp 100 capable of adjusting humidity autonomously, and therefore it is possible to extend a life of the lamp while improving light distribution performance.

Figure 2:
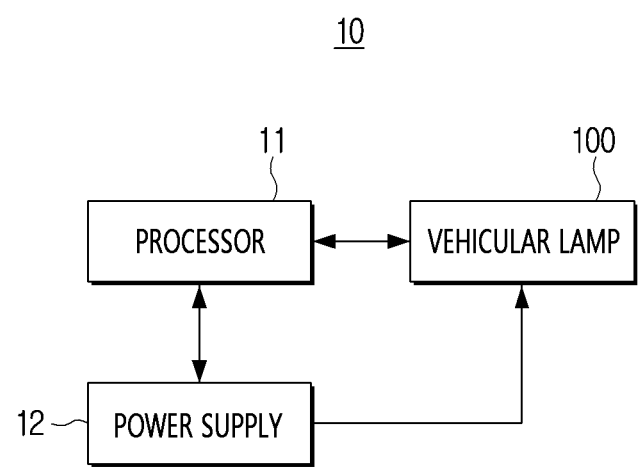
FIG. 2 is a block diagram for explaining an electronic configuration of a vehicle according to the present disclosure.

FIG. 2 is a block diagram for explaining an electronic configuration of the vehicle 10.

Referring to FIG. 2, the vehicle 10 may include a processor 11, a power supply 12, and the vehicular lamp 100.

The processor 11 may control each component in the vehicle 10. The processor 11 may control an operation of the vehicular lamp 100 according to manipulation of the user and a value detected by any of various sensors. The processor 11 may check states of various electronic components provided in the vehicle 10 and control the operation thereof. Alternatively, the processor 11 may be referred to as a central control device or a center fascia, but in this specification, it is collectively referred to as the processor 11.

The processor 11 may control the power supply 12 so that the power is supplied to the vehicular lamp 100 selectively according to an operation state of the vehicle 10.

Specifically, in a state in which the power of the vehicle 10 is turned off, the processor 11 may control the power supply 12 so that the power is not supplied to the vehicular lamp 100.

In addition, in a state in which the vehicle is started or in a standby state, the processor 11 may control the power supply 12 so that the power is supplied to the vehicular lamp 100. In this case, the processor 11 may also control the power supply 12 so that the power is supplied only when the operation of the vehicular lamp 100 is needed, although the vehicle is started.

The power supply 12 may supply the power to each configuration in the vehicle 10 using a secondary battery (or battery). Specifically, the power supply 12 may supply the power to the vehicular lamp 100 via a cable (not shown). At this point, the cable may not only supply the power but may also transmit a control signal for controlling a power source state of the vehicular lamp 100 to the vehicular lamp 100.

The vehicular lamp 100 may selectively emit light according to the control signal provided from the processor 11 and the power provided from the power supply 12. The vehicular lamp 100 may be referred to as a headlight module, a headlight device, a lamp, a lamp module, and the like.

The vehicular lamp 100 may autonomously perform an operation of adjusting internal temperature and humidity, without the control of the processor 11. The specific configuration of the vehicular lamp 100 will be described below with reference to FIG. 3.

Meanwhile, although the simple electronic configuration of the vehicle 10 has been illustrated above, various configurations may be added to the vehicle 10 in actual implementation. For example, a sensor for detecting external luminance, a manipulation part for selecting an operation of the lamp, and the like may be further included.

Figure 3:
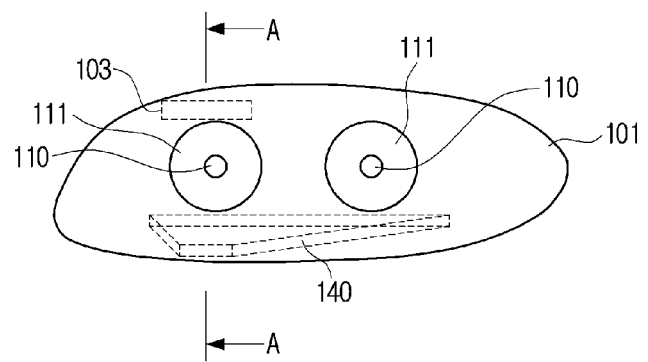
FIG. 3 is a front view of a vehicular lamp according to an embodiment of the present disclosure.

FIG. 3 is a front view of the vehicular lamp 100 according to an embodiment of the present disclosure.

Referring to FIG. 3, the vehicular lamp 100 may include a light source 110, a housing 101, and a glass 102.

The light source 110 emits light. Specifically, the light source 110 may be disposed at one surface of the housing 101 of the vehicular lamp 100 to emit light according to a user's manipulation or a control of the processor 11. Although FIG. 3 shows a case where there are two light sources 110, the number, the position, the size, and the like of light sources may vary. For the light source 110, various light emitting components such as an LED lamp, a halogen lamp, an HID lamp, an incandescent lamp, and the like may be used.

The housing 101 may support each configuration in the vehicular lamp 100 and may form an appearance thereof. Specifically, the light source 110 and a reflector 111 may be disposed in the housing 101, the glass 102 may be disposed at a front side of the housing 101, a first flow path 140 may be coupled through a hole provided at a lower end of a rear surface of the housing 101, and an air blowing port 103 may be positioned at an upper end of the rear surface of the housing. In another embodiment, the first flow path 140 may be coupled through a hole at an upper end of the rear surface of the housing 101, and the air blowing port 103 may be positioned at a lower end of the rear surface of the housing.

The reflector 111 for reflecting light of the light source 110, preferably, in a direction toward the glass 102, may be formed in one surface inside the housing 101. Specifically, the housing 101 may formed of an insulating material for internal insulation, and the reflector 111 may be formed in an upper surface of the insulating material, that is, one surface on which the light source 110 is disposed.

The reflector 111 may serve to reflect light, which is not emitted in a direction toward a front surface from among light incident from the light source 110, in the direction toward the front surface and may be formed of a material such as aluminum. Meanwhile, if the reflector has a reflecting function in actual implementation, a material other than aluminum may be used.

The glass 102 may be disposed ahead of at least one light source 110 and cover an opening in a front surface of the housing 101. The light source 110 may emit light in a direction toward the glass 102, and the glass 102 may transmit light generated from the light source 110 to the outside.

The glass 102 may be of a transparent material so as to transmit light emitted from the light source 110, and may serve as an outer lens. Meanwhile, in actual implementation, the glass 102 may have a specific color according to a type of the vehicular lamp 100.

Figure 4:
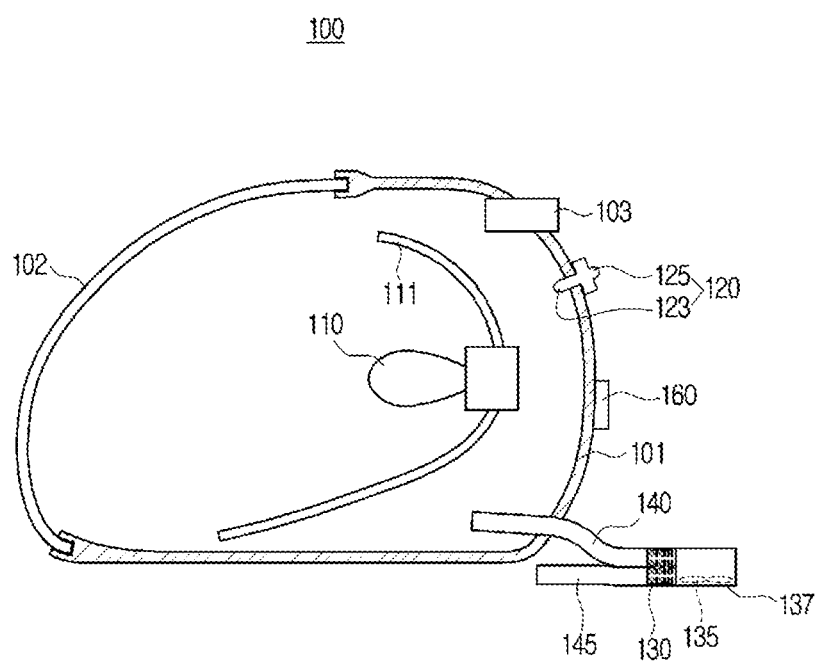
FIG. 4 is a cross-sectional view taken along a line A-A shown in FIG. 3 and showing a configuration provided in a vehicular lamp.

FIG. 4 is a cross-sectional view taken along a line A-A illustrated in FIG. 3 and showing a configuration provided in the vehicular lamp 100.

Referring to FIG. 4, the vehicular lamp 100 may include a thermoelectric element unit 130 and a second flow path 145.

The thermoelectric element unit 130 may be a device for releasing cold air or hot air using a thermoelectric element, and the thermoelectric element may be an element using a Peltier effect which is a phenomenon in which one surface is cooled or heated by a current flow, and thus, the thermoelectric element may be referred to as a Peltier element.

Since there is no limit in size and shape of the thermoelectric element, the thermoelectric element may be in the shape of a hexahedron with horizontal and vertical lengths of 4 cm to 7 cm and a height of 1 cm or less, and the size and shape thereof may vary according to a size of the vehicular lamp 100 and an internal structure of the vehicle 10. The thermoelectric element may include a semiconductor unit in which a plurality of p-type semiconductors and n-type semiconductors are repeatedly disposed, two ceramic plates disposed to face each other with respect to the semiconductor unit to receive cold air or hot air generated by the semiconductor unit, a plurality of pins provided on each ceramic plate to spread the cold air or hot air, and the like.

A first part 131 may refer to one of the two ceramic plates and the plurality of pins provided on the ceramic plate, and a second part 132 may refer to the ceramic plate and the pins on the opposite side. Accordingly, in the thermoelectric element, when the current flows in a certain direction, the first part 131 may be cooled and the second part 132 may be heated, and when the current flows in the opposite direction, the first part 131 may be heated and the second part 132 may be cooled.

The thermoelectric element unit 130 may be positioned at a lower end of an external rear surface of the housing 101 and may exchange heat with the air introduced from the outside of the housing 101.

When the thermoelectric element unit 130 is positioned inside the housing 101, there is a limit in size of the first part 131 and the second part 132, where the heat exchange occurs, and the first fan 135, where the air flow occurs, but since the thermoelectric element unit 130 is positioned at the external rear surface of the housing 101, a restriction in volume of each component is reduced, thereby improving the heat exchange performance of the thermoelectric element unit 130.

In addition, it is advantageous that, if the thermoelectric element unit 130 needs to be inspected or replaced, the thermoelectric element unit 130 may be inspected and repaired or replaced easily without disassembling the housing 101, since the thermoelectric element unit 130 is positioned at the external rear surface of the housing 101.

Therefore, as the thermoelectric element unit 130 is positioned at the external rear surface of the housing 101, performance of controlling internal temperature of the housing 101 may be improved and repair and inspection may be facilitated compared to an embodiment in which the thermoelectric element unit 130 is positioned inside the housing 101.

The thermoelectric element unit 130 may include the first part 131 generating one of cold air and hot air when an electric signal is applied, and the second part 132 disposed at an upper side of the first part 131 with respect to the position of the housing 101 and generates the other one of the cold air and the hot air when the electric signal is applied.

A body part 137 may divide a space where the first part 131 and the second part 132 are disposed, and an opening may be formed in a bottom surface thereof. The first part 131 and the second part 132 may be disposed in a vertical direction by the body part 137, and the second part 132 may be disposed below the first part 131.

The body part 137 may support the first part 131, the second part 132, and the first fan 135, and may guide the air introduced from the opening by the first fan 135 in a direction toward the first part 131 and the second part 132.

The first fan 135 may be disposed at the opening of the body part 137, and preferably disposed in parallel with a bottom surface of the body part 137 to introduce air from the outside of the housing 101. When the first fan 135 is driven, the first fan 135 may introduce the external air of the housing 101 into the thermoelectric element unit 130, and the introduced air may be subject to heat exchange while passing through the first part 131 or the second part 132 and may be changed to one of cold wind or hot wind.

There is no limit in type and shape of the first fan 135, but the fan should at least generate an air flow at least in one direction. Fans with various types and shapes such as a first high-speed fan, a first silent fan, a first small-sized fan, and the like may be used according to an industrial field in which the vehicular lamp 100 according to the present disclosure is applied.

Referring to FIG. 3, the thermoelectric element unit 130 may include the first flow path 140 and the second flow path 145. A flow path may be added in order to effectively transfer the cold wind and the hot wind.

The first flow path 140 is connected to the first part 131 of the thermoelectric element unit 130, and the second flow path 145 is connected to the second part 132. Accordingly, the first flow path 140 may introduce one of the cold wind and the hot wind generated from the first part 131 into the housing 101, and the second flow path 145 may discharge the other one of the cold wind and the hot wind to the outside of the housing 101.

The configurations and shapes of the first flow path 140, the second flow path 145, and the first fan 135 will be described later in detail with reference to FIGS. 9 and 7.

The air blowing port 103 may be disposed at a bottom surface, a side surface, an upper end of a rear surface, or a lower end of the rear surface of the housing 101. The air blowing port 103 may be an opening for discharging the air introduced into the housing 101 to the outside of the housing 101, and may induce the air in a direction preset as a discharge direction according to the shape and position of the air blowing port 103.

The air introduced to the inside via the first flow path 140 may decrease or increase the temperature while circulating inside of the housing 101, and may be discharged to the outside of the housing 101 via the air blowing port 103 disposed at the lower end.

A separate air blowing port fan (not shown) may be disposed at the air blowing port 103. The air blowing port fan may control an air exhaust direction and an air exhaust speed of the air blowing port 103 according to an air exhaust direction and an air volume.

An embodiment of driving of the vehicular lamp 100 will be described. When the temperature in the housing 101 increases due to the heat generated from the light source 110, the humidity may increase and condensation may occur. In this case, the vehicular lamp 100 may be driven and the cold wind may flow into the housing 101 via the first flow path 140. The introduced air may be heat-exchanged with the internal air, thereby adjusting the temperature in the housing 101. In addition, the heat-exchanged air may be discharged to the outside via the air blowing port 103 formed in the lower portion.

Since the air blowing port 103 is disposed at the upper end, the heat-exchanged air may be discharged from the inside of the housing 101, and the air in the housing 101, which is pushed by the air introduced from the outside, may be discharged to the outside.

The opening of the air outlet 103 may be smaller than that of the first flow path 140. A flow velocity of the air discharged via the air blowing port 103 increases as the opening of the air blowing port 103 is narrowed, and it may be effective to prevent the introduction of the air from the outside of the housing 101 via the air blowing port 103.

A sensor 120 may include an internal sensing part 123 for detecting at least one of a temperature and humidity in the housing 101.

Specifically, the internal sensing part 123 may include at least one of a humidity sensor for measuring internal humidity of the vehicular lamp 100 and a temperature sensor for detecting internal temperature of the vehicular lamp 100, or may be a temperature-humidity sensor for detecting the temperature and the humidity at the same time.

The sensor 120 may be disposed at the external rear surface of the housing 101 and the internal sensing part 123 may sense the internal temperature or internal humidity of the housing 101 via a hole formed in the rear surface of the housing 101.

A controller 160 may selectively introduce one of the cold wind and hot wind into the vehicular lamp 100 by converting polarity of an electric signal provided to the thermoelectric element unit 130 based on a detection result of the sensor 120.

The controller 160 may be disposed at the external rear surface of the housing 101 or inside of the housing 101 to control the operation of the thermoelectric element unit 130 based on a sensing value detected by the sensor 120. The specific operation of the controller 160 will be described later in detail with reference to FIG. 11.

The sensor 120 may further include an external sensing part 125 for obtaining at least one of external humidity and external temperature of the housing 101.

Since the sensor 120 may be disposed at the external rear surface of the housing 101, the external sensing part 125 may sense the temperature or the humidity of the external rear surface of the housing 101 and provide the obtained result to the controller 160.

Alternatively, the external sensing part 125 may be disposed to be exposed to the outside of the vehicle 10 in order to measure the external temperature and the humidity of the vehicle 10. A main reason for occurrence of the moisture and the condensation in the vehicular lamp 100 may be a difference in temperature between the outside of the vehicle 10 and the inside of the housing 101 with respect to the glass 102. Therefore, if the external sensing part 125 may be disposed in the vehicular lamp 100 or disposed in the vehicle 10, it may be difficult to accurately detect the difference in temperature and humidity, and accordingly, the external sensing part 125 may be positioned outside of the vehicle 10.

In an embodiment where the external sensing part 125 is not included, external temperature or humidity information may be received from the processor 11 of the vehicle 10. The controller 160 may control the operation of the thermoelectric element unit 130 by comparing the information received form the processor 11 and the result detected from an internal sensor.

The controller 160 may control the operation of the thermoelectric element unit 130 by comparing the detection result of the internal sensing part 123 and the obtained result of the external sensing part 125. The operation of the vehicular lamp 100 by the controller 160 will be described later in detail with reference to FIG. 11.

Meanwhile, in describing FIGS. 3 and 4, the simple configuration of the vehicular lamp 100 is illustrated and described, but in actual implementation, the vehicular lamp 100 may further include various other configurations.

For example, a lamp capable of changing a light emission direction of the light source 110 may further include a driving member (not shown) for changing the light emission direction, may further include a shield (not shown) for deriving light scattered from the light source 110 to the reflector 111, and may further include a bezel (not shown) surrounding the reflector 111.

Figure 5:
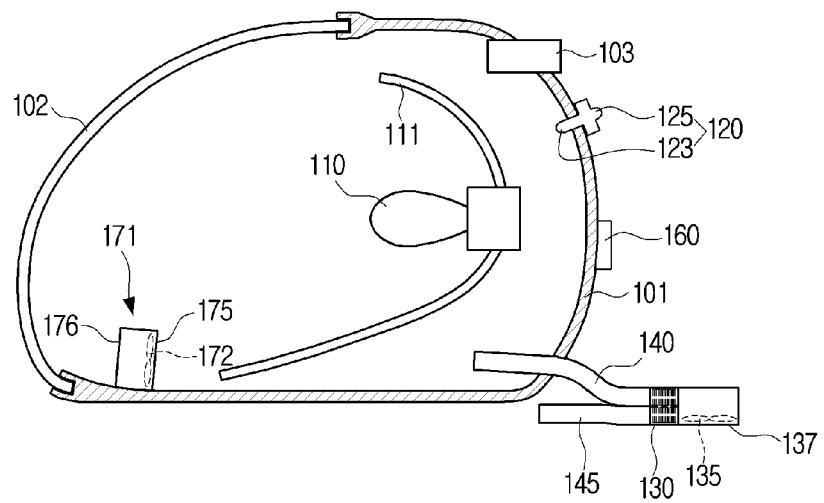
FIG. 5 is a cross-sectional view taken along the line A-A shown in FIG. 3 and showing a configuration provided in a vehicular lamp.

FIG. 5 is a cross-sectional view taken along the line A-A shown in FIG. 3 and showing the configuration provided in the vehicular lamp 100 together.

Referring to FIG. 5, in one embodiment of the present disclosure, a second fan 172 and a fan housing 171 may be included.

The second fan 172 may be disposed in the housing 101 to circulate air inside the housing 101 introduced into the first flow path 140.

Since the thermoelectric element unit 130 according to an embodiment of the present disclosure is disposed at a lower end of the external rear surface of the housing 101, air introduced via the first flow path 140 may also move from the lower rear surface of the housing 101 in a direction toward the glass 102. Therefore, the second fan 172 circulates the introduced air in the housing 101 to increase the effect of regulating the temperature inside the housing 101.

In particular, when cold air is introduced via the first flow path 140, the cold air may be accumulated at the lower end of the housing 101 since the cold air is relatively heavier than the air inside the hot housing 101. Therefore, the second fan 172 may circulate the air introduced from the thermoelectric element unit 130 into the housing 101, preferably toward the glass 102 or the air blowing port 103, thereby effectively removing moisture in the vehicular lamp 100.

The fan housing 171 may be disposed at a front side of the bottom surface of the housing 101 of the vehicular lamp 100 to support the second fan 172. The fan housing 171 may have a box structure, as shown in FIG. 5, or may have a support structure supporting a rotational shaft of the second fan 172. Hereinafter, a box structure having a first opening 175 and a second opening 176 to cause air circulation therein will be described as an example.

The fan housing 171 may include a first opening 175 formed in a direction toward a rear surface to suck in air, and a second opening 176 formed in a direction toward a front surface to discharge air. In this case, the second fan 172 may be disposed in parallel with the first opening 175 or the second opening 176, and the second fan 172 may cause movement of air in the first opening 175 and the second opening 176.

The fan housing 171 may introduce air in a direction toward a lower surface and discharge air in the direction toward the front surface. Accordingly, the air introduced via the first flow path 140 may be transferred in the direction toward the front glass 102 and spread to the entire area of the housing 101, and may be guided to the upper end of the housing 101 along the glass 102.

FIG. 5 is a side view showing that the fan housing 171 is disposed at the lower end of the reflector 111, but in actual implementation, the fan housing 171 may be disposed at the lower end side of the reflector 111 to induce circulation of air without blocking the path of light reflected from the reflector 111. In addition, the fan housing 171 may be of a material capable of reflecting light of the light source 110 toward the glass 102 like the reflector 111, and may be of the same material as that of the reflector 111.

Figure 6:
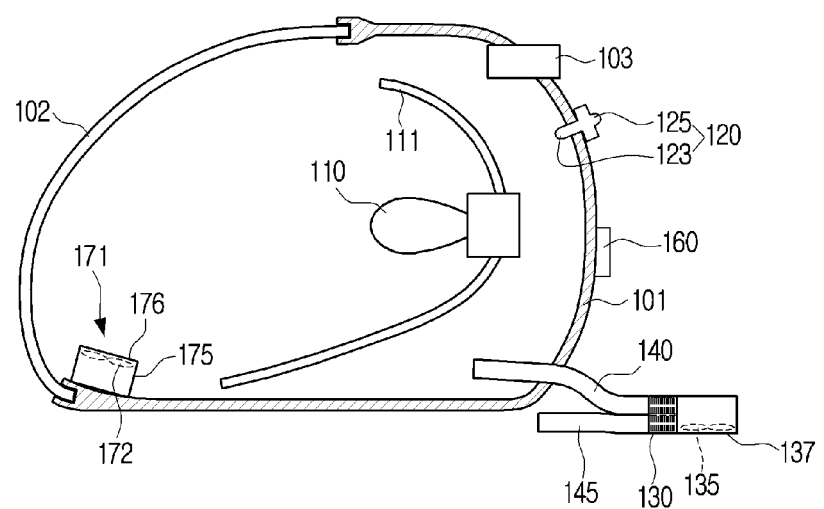
FIG. 6 is a cross-sectional view taken along the line A-A shown in FIG. 3 and showing a configuration provided in a vehicular lamp.

FIG. 6 is a cross-sectional view taken along the line A-A shown in FIG. 3 and showing the configuration provided in the vehicular lamp 100 together.

Referring to FIG. 6, in an embodiment of the present disclosure, arrangements of the first opening 175, the second opening 176, and the second fan 172 may vary.

For example, the first opening 175 of the fan housing 171 may be formed in a direction toward the rear surface of the housing 101 to suck in air, and the second opening 176 may be formed in a direction toward an upper surface of the housing 101 to discharge air. In this case, the second fan 172 may be disposed in parallel with the second opening 176, and the second fan 172 may cause movement of air between the first opening 175 and the second opening 176.

The second opening 176 of the fan housing 171 may guide air introduced into the first opening 175 toward the top of the housing 101. Therefore, when cold air is introduced from the first flow path 140, the cold air may be guided to the top of the housing 101, so that the temperature of the housing 101 may be more efficiently controlled.

Figure 7:
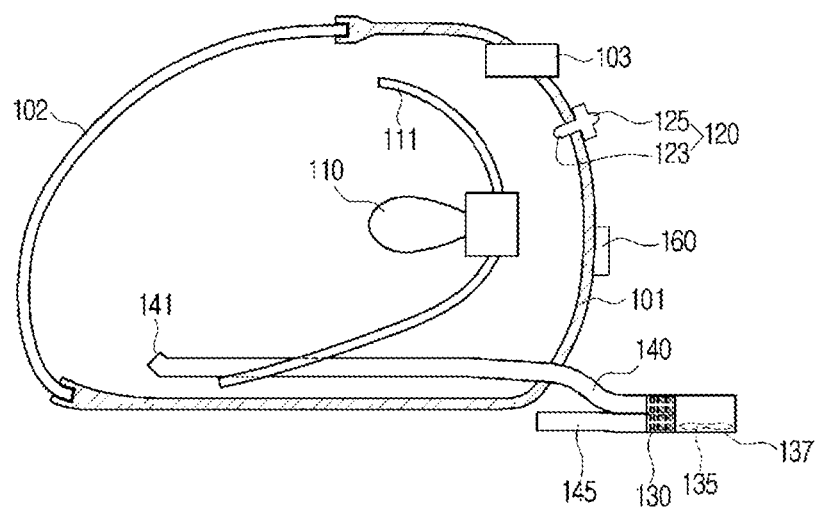
FIG. 7 is a cross-sectional view taken along the line A-A shown in FIG. 3 and showing a configuration provided in a vehicular lamp together.

FIG. 7 is a cross-sectional view taken along the line AA shown in FIG. 3 and showing the configuration provided in the vehicular lamp 100 together.

Referring to FIG. 7, the first flow path 140 may include an inlet 141.

In more detail, the first flow path 140 may include the inlet 141 for discharging air into the housing 101, and the inlet 141 may be disposed ahead of the reflector.

In the vehicular lamp 100, the highest heat is generated in the light source 110, and the reflector may reflect the heat along with light toward the front surface. In addition, an area most required to remove moisture to prevent light spreading in the housing 101 may be the front surface of the reflector 111.

Therefore, the inlet 141 of the first flow path 140 may be disposed extending to the front surface of the reflector 111, so that cold or hot air generated in the thermoelectric element unit 130 is discharged directly to the area most required to control temperature in the housing 101.

The inlet 141 may be curved at a predetermined angle, and according to an embodiment, air may be discharged toward the upper surface of the housing 101. When cold air is introduced from the first flow path 140, the cold air may be effectively transferred to the top of the housing 101 by an exhaust direction of the inlet 141.

In the first flow path 140, an area adjacent to the inlet 141 may be preferably of a material capable of reflecting the light of the light source 110, and may be of the same material as that of the reflector 111, and may be of a material with excellent heat dissipation properties.

Figure 8:
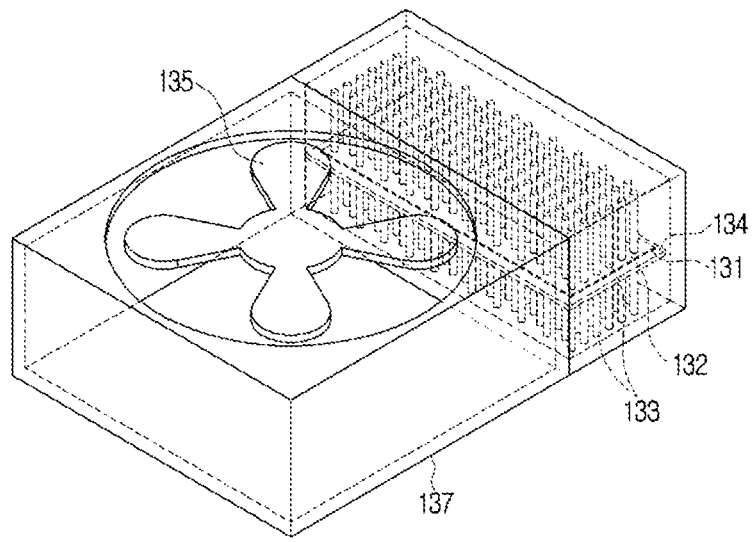
FIG. 8 is a diagram illustrating a thermoelectric element unit according to an embodiment of the present disclosure.

FIG. 8 is a diagram illustrating the thermoelectric element unit 130 according to an embodiment of the present disclosure.

Referring to FIG. 8, the thermoelectric element unit 130 may include the first part 131, the second part 132, the first fan 135, and the body part 137 described above.

The first fan 135 may be disposed in parallel with the bottom surface of the body part 137 to introduce the air from the upper direction, and there may be no limit in thickness of the thermoelectric element unit 130 in a vertical direction.

Specifically, if the first fan 135 is disposed vertically from the bottom surface of the body part 137, the first fan 135 may have only a size within a range of the vertical height of the body part 137. However, since the first fan 135 of the present disclosure is disposed in parallel with the bottom surface of the body part 137 and the body part 137 has a structure of guiding the introduced air to the first part 131 and the second part 132, the first fan 135 may have a relatively large size, considering the size of the bottom surface of the body part 137.

The thermoelectric element unit 130 may further include a plurality of pins 133 that come into contact with the first part 131 and the second part 132.

The pins 133 may increase the heat exchange efficiency by increasing a surface area coming into contact with the air at a time of the heat exchange between the air and the thermoelectric element. Therefore, the pins 133 may be formed of a material with high thermal conductivity.

The pins 133 illustrated in FIG. 8 may be disposed at both an upper ceramic plate and a lower ceramic plate to configure the first part 131 and the second part 132. The air introduced to the direction of the first part 131 and the second part 132 may pass the pins to be heated or cooled.

The shape of the pin 133 may be a cylindrical shape or a pole shape, a shape of one or more boards parallel to an air proceeding direction, and may be in any of various shapes for increasing the surface area by passing the air. Alternatively, the pin may be referred to as a heat dissipation member.

Since the first part 131 and the second part 132 are cooled or heated, the thermoelectric element unit 130 may have a difference in temperature between the first part 131 and the second part 132. For energy efficiency, it is advantageous that the cold wind or hot wind generated from the first part 131 is discharged into the housing 101 while maintaining the cooled or heated state.

Therefore, in order to minimize unnecessary heat exchange in the thermoelectric element unit 130, the thermoelectric element unit 130 may further include an insulator 134 disposed at a side surface of the first part 131 and the second part 132.

The insulator 134 may be made of a material with low thermal conductivity. In addition, although not illustrated in the drawings, the insulator 134 may be disposed extending between the first flow path 140 and the second flow path 145.

As described above, the body part 137 may support the configuration of the thermoelectric element unit 130 and transfer the introduced air.

Specifically, if the first part 131 of FIG. 8 is assumed as the lower portion and the second part 132 is assumed as the upper portion, the first fan 135 may transfer the air outside of the housing 101 to a downward direction orthogonal to the first part 131 and the second part 132. In addition, the body part 137 may divide the air transferred in the downward direction to flow to the first part 131 and the second part 132, thereby deriving in a horizontal direction.

If the body part 137 is not included and the first fan 135 is disposed directly on a side surface of the thermoelectric element, the volume of the thermoelectric element unit may increase.

Specifically, in order to introduce the air smoothly into the thermoelectric element unit 130, it is necessary to ensure the size of the first fan 135 to a constant level or higher. However, there is a problem that, as the size of the first fan 135 increases, the opening of the thermoelectric element unit 130 increases and the volume of the entire thermoelectric element unit 130 may increase.

Accordingly, in order to position a configuration that serves as the thermoelectric element unit 130 of the present disclosure, it is necessary to reduce the size of the fan or provide a separate space on the rear surface or the side surface of the vehicle 10.

However, the thermoelectric element unit 130 of the present disclosure may be disposed at the upper portion of the housing 101 and a direction in which the air is introduced by the first fan 135 may be guided from the upper portion to the lower portion by the body part 137.

Therefore, in the vehicular lamp 100 according to the present disclosure, if the horizontal length of the thermoelectric element unit 130 increases, a sufficient size of the first fan 135 may be ensured. In addition, the plurality of fans 135 may be connected in parallel with the side surface of the thermoelectric element unit 130.

Therefore, it is advantageous that the thermoelectric element unit 130 of the present disclosure is coupled to the upper portion of the housing 101 to minimize a vertical height.

Accordingly, in the present disclosure, it is possible to minimize the ensuring the inner space of the vehicle 10 and apply various types of the vehicular lamp 100 to the housing 101, thereby ensuring compatibility.

Meanwhile, in illustrating and describing FIG. 8, it has been illustrated and described that one thermoelectric element is disposed in the vehicular lamp 100, but in actual implementation, a plurality of thermoelectric elements may be used.

Figure 9:
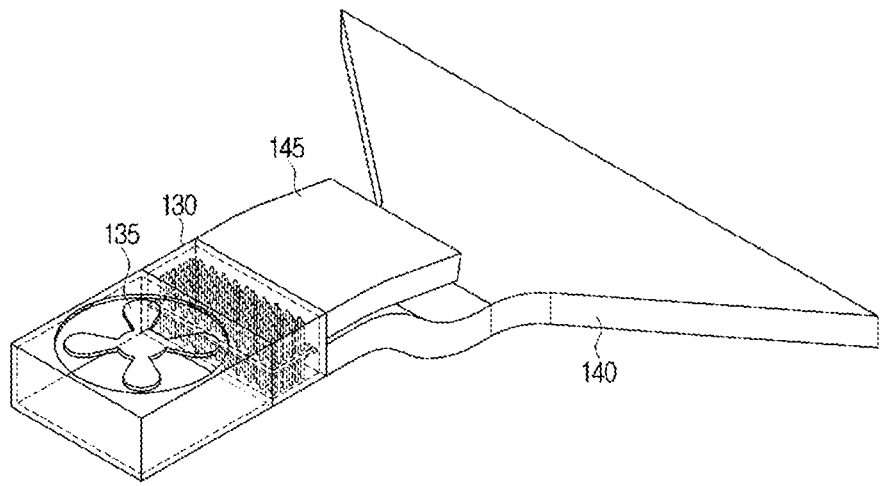
FIG. 9 is a view illustrating coupling of a thermoelectric element unit, a first flow path, and a second flow path according to an embodiment of the present disclosure.

FIGS. 9 and 7 are diagrams illustrating a combination between the thermoelectric element unit 130 and the first flow path 140 and the second flow path 145 according to an embodiment.

In regard to the first flow path 140, referring to FIGS. 6 and 7, the first flow path 140 may be in a shape having a cross-sectional area increasing in a direction toward the glass 102 so that one of the cold wind and the hot wind circulates by convention in the housing 101 along an inner side surface of the glass 102.

As the first flow path 140 has the cross-sectional area that increases in the direction toward the glass 102, the cold wind or hot wind of the first part 131 may be transferred to the entire area of the inside of the vehicular lamp 100 and the temperature of the entire area of the inside of the housing 101 may be evenly adjusted.

In doing so, it is possible to prevent reverse current due to the temperature difference in the housing 101 and to effectively guide the air flow to evenly adjust the temperature and humidity therein.

As shown in FIG. 9, if a trumpet-shaped first flow path 140 is provided, the hot wind or cold wind may be transferred over a wide area as much as possible on the glass 102. According to various embodiments of the present disclosure, it may be produced with an outlet having an open part and a closed part, without fully opening the outlet of the first flow path 140, so that the hot wind or the cold wind is transferred intensively to a condensation prone area of the glass 102. Alternatively, the outlet may be produced to not be opened but closed, and a plurality of holes may be punched so that the hot wind or the cold wind may flow to the side of the glass 102 via the holes. As described above, if the area of the outlet is reduced, stronger wind may be transferred to the glass 102 without a need for increasing the driving power of the first fan 135.

In regard to the second flow path 145, referring to FIG. 9, the second flow path 145 may be formed to discharge the other one of the cold wind and the hot wind to a direction external to the glass 102. The direction external to the glass 102 may be a direction external to the vehicle 10, and such a structure may allow the cooled or heated air to be discharged directly to the outside of the vehicle 10. When the second flow path 145 is formed as illustrated in FIG. 9, wind with different characteristics from wind discharged from the first flow path 140 may be transferred to the outside of the glass. For example, if the hot wind is output from the first flow path 140 into the glass and the cold wind is output from the second flow path 145 to the outside of the glass, a difference in temperature between the inside and the outside of the glass may be more quickly resolved. In addition, it is possible to prevent the hot wind or the cold wind from being transferring directly to other components disposed at a rear or upper side of the vehicular lamp 100, a hood, and the like.

Figure 10:
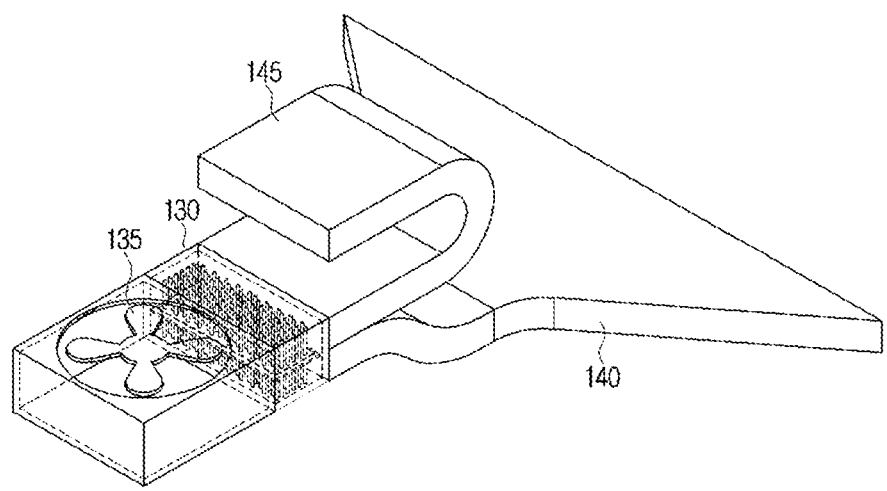
FIG. 10 is a view illustrating coupling of a thermoelectric element unit, a first flow path, and a second flow path according to an embodiment of the present disclosure.

Meanwhile, according to another embodiment of the present disclosure, the second flow path 145 may be formed to face in a rearward direction of the vehicular lamp 100, that is, a direction toward a rear surface of the housing 101, as illustrated in FIG. 10.

Since the second flow path 145 discharges the cold wind or the hot wind in a direction opposite to the direction toward the first flow path 140, the proceeding directions of the first flow path 140 and the second flow path 145 may be set differently to minimize unnecessary secondary heat exchange between the first flow path 140 and the second flow path 145.

In addition, if the second flow path 145 is disposed as illustrated in FIG. 10, the second flow path may have a function of adjusting the temperature of the rear portion of the vehicular lamp 100.

As described above, the vehicular lamp 100 according to the present disclosure may be separated from the processor 11 of the vehicle 10 and receive the power from the power supply 12 to be driven independently. Therefore, it is possible to transfer the cold wind or the hot wind to the rear surface of the vehicular lamp 100 so as to meet the needs of the function of the vehicle 10 according to the arrangement position.

Figure 11:
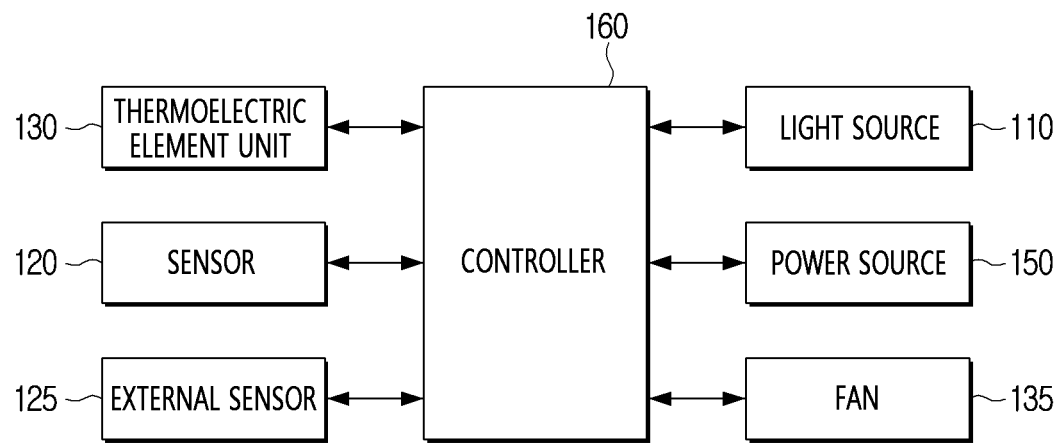
FIG. 11 is a block diagram for explaining a configuration of a vehicular lamp according to an embodiment of the present disclosure.

FIG. 11 is a block diagram illustrating a configuration of the vehicular lamp 100 according to an embodiment.

Referring to FIG. 11, the controller 160 may be directly connected to the power supply 150.

The power supply 150 serves to provide power provided by the power supply 12 of the vehicle 10 to each component in the vehicular lamp 100.

The controller 160 provides power from the power supply 150 to the light source 110. In this case, the controller 160 may selectively provide power to the light source 110 based on a control signal provided from the processor 11.

The controller 160 may independently control and adjust the power of the thermoelectric element unit 130 based on a value measured by the sensor 120.

For example, if a humidity value detected by the sensor 120 is a preset value or higher, the controller 160 may provide the power of the power source 150 to the thermoelectric element unit 130 so that the thermoelectric element unit 130 is operated.

In this case, the controller 160 may control the power source 150 so that the power is supplied to the thermoelectric element unit 130 with power supply duty corresponding to the detected humidity value. For example, the power source 150 may provide power with duty of 30% to the thermoelectric element unit 130 in response to the humidity value of 50% to 60%, power with duty of 50% to the thermoelectric element unit 130 in response to the humidity value of 60% to 70%, and power with duty of 100% (in other words, continuously supply power) to the thermoelectric element unit 130 in response to the humidity value of 70% or more.

The above numerical values are merely examples and the value may be variously applied depending on a volume of the thermoelectric element, a wind volume of the first fan 135, a size of the inner space of the vehicular lamp 100, and the like.

Specifically, if the internal temperature of the housing 101 of the vehicular lamp 100 is increased due to the light source 110 and the humidity thereof is increased, the moisture should be removed by decreasing the temperature in the vehicular lamp 100 by the controller 160.

When the humidity range is within a preset range in which the humidity needs to be reduced, the power with preset size and polarity may be provided to the thermoelectric element unit 130 to cool the first part 131 and drive the first fan 135. The air cooled in the first part 131 may be transferred into the housing 101 via the first flow path 140, thereby decreasing the temperature in the vehicular lamp 100. In addition, the internal air with high humidity may be discharged to the outside of the housing 101 via the air blowing port 103, thereby adjusting the humidity.

Meanwhile, in the winter, it may be difficult to remove the moisture by the cooling method. In such a case, the controller 160 may increase the temperature in the vehicular lamp 100 based on values of temperature and humidity measured by the external sensing part 125.

Specifically, the controller 160 may heat the first part 131 of the thermoelectric element unit 130 and drive the first fan 135. If the above operation is used, the relative humidity in the vehicular lamp 100 is increased and the air with high humidity may be discharged to outside via the air blowing port 103, thereby preventing dew from being formed in the glass 102 of the vehicular lamp 100. After confirming that the internal air with high humidity is discharged by the sensor 120, the controller 160 may control the power of the thermoelectric element unit 130 again to adjust the temperature and the humidity.

That is, in the present disclosure, the thermoelectric element may be automatically operated by the controller 160 according to a measurement value transferred from the sensor 120 to remove the moisture in the vehicular lamp 100 and prevent the condensation. Accordingly, it is possible to improve the light distribution performance of the vehicular lamp 100.

The controller 160 may be implemented as a switching element for supplying the power of elements such as an integrated circuit, an MPU, an ASIC, and a processor 11 and the thermoelectric element unit 130. In addition, a control system of the thermoelectric element unit 130 of the controller 160 may be a pulse width modulation (PWM) method.

Depending on the temperature and humidity conditions, one of the cold wind and the hot wind may be more efficient to remove moisture. In the manufacturer of the vehicular lamp 100, driving conditions in which the moisture is removed in each temperature and humidity condition most rapidly may be determined through repeated experiments while variously changing the internal temperature and humidity and external temperature and external humidity of the vehicular lamp. When a memory is provided in the vehicular lamp 100, the memory may store temperature and humidity conditions and the driving conditions matched to each other.

The controller 160 may determine the current temperature and humidity conditions by comparing the detection results of the internal sensing part 123 and the external sensing part 125 of the sensor 120, may read out the driving condition matched with the above condition from the memory, and may drive the thermoelectric element unit 130 according to the condition. Accordingly, it is possible to remove the moisture rapidly and efficiently.

Meanwhile, it has been described above that the controller 160 performs both the control function and the power supply function of the thermoelectric element unit 130, but both functions may be separately performed by a plurality of elements. That is, the control function may be performed by a separate integrated circuit and the power supply function may be performed by a plurality of switching elements. At this point, the plurality of switching elements may configure an H-bridge circuit.

As described above, the vehicular lamp 100 according to the present disclosure may adjust the humidity in the vehicular lamp 100 by itself, thereby reducing resources of the system of the vehicle 10.

Meanwhile, in illustrating and describing FIG. 11, it has been illustrated and described that the controller 160 controls the light source 110, but in actual implementation, the light source 110 may be controlled directly by the processor 11 and the controller 160 may not control the light source 110. That is, the controller 160 may control only the humidity in the vehicular lamp 100, without the control of the processor 11.

Meanwhile, in illustrating and describing FIG. 11, it has been described that the controller 160 controls the operation of the thermoelectric element unit 130 only according to the detected temperature and humidity, but in actual implementation, the controller 160 may control the operation of the thermoelectric element unit 130 in consideration of whether the light source 110 is operated.

Figure 12:
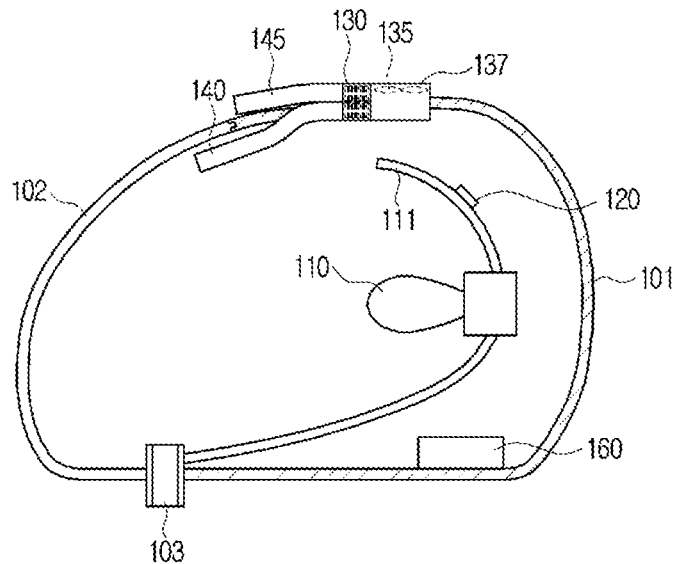
FIG. 12 is a diagram illustrating a thermoelectric element unit according to an embodiment of the present disclosure.

FIG. 12 is a diagram illustrating the thermoelectric element unit 130 according to an embodiment.

Referring to FIG. 12, the thermoelectric element unit 130 may be disposed at a hole of an upper side of the housing 101 and the sensor 120 may be disposed at a rear side of the light source 110 in the housing 101.

The vehicular lamp 100 is disposed at an edge part such as a front, side, and rear portion of the vehicle due to its characteristics, and accordingly, a large amount of other components are mounted on the rear side of the vehicular lamp 100. Accordingly, there is no sufficient space to add new components, and in order to ensure the space, not only the structure of the vehicular lamp 100, but also a component layout of the vehicle itself has to be changed. However, if the thermoelectric element unit 130 is disposed at the upper side of the vehicular lamp 100 as illustrated in FIG. 12, the thermoelectric element unit 130 may be disposed and only the flow path part may be added by punching the hole on the upper side of the housing 101 of the vehicular lamp 100, and accordingly, the shapes or arrangement structures of other components may not be changed, which significantly increases compatibility.

The sensor 120 may be disposed at a part of the rear side of the light source 110 in the housing 101. Specifically, the sensor 120 may be disposed at the rear surface of the reflector 111. If the sensor 120 is positioned in front of the light source 110, it may be difficult to accurately detect the internal temperature and internal humidity of the vehicular lamp 100 due to the heat radiated from the light source 110 when driving the vehicular lamp 100, and therefore the sensor is preferably positioned on the rear portion of the light source.

While preferred embodiments of the present disclosure have been shown and described, the present disclosure is not limited to the aforementioned specific embodiments, and it is apparent that various modifications can be made by those having ordinary skill in the technical field to which the present disclosure belongs, without departing from the gist of the present disclosure as claimed by the appended claims, and also, it is intended that such modifications are not to be interpreted independently from the technical idea or prospect of the present disclosure.

The invention claimed is:

1. A vehicular lamp comprising:
   a light source;
   a glass disposed ahead of the light source;
   a housing configured to support the light source and the glass and form an appearance;

a thermoelectric element unit disposed at a lower end of an external rear surface of the housing and configured to generate cold wind and hot wind by introducing external air of the housing;

a first flow path introducing one of the cold wind and the hot wind generated by the thermoelectric element unit into the housing; and a second flow path discharging the other one of the cold wind and the hot wind to outside of the housing, wherein the thermoelectric element unit comprises:

a first part connected to the first flow path and generating one of the cold air and the hot air;

a second part connected to the second flow path and generating the other one of the cold air and the hot air;

a body part dividing a space where the first part and the second part are disposed and having an opening formed in a bottom surface thereof; and a first fan disposed at the opening of the body part and introducing air in a direction from a lower portion to an upper portion, wherein the vehicular lamp further comprises:

an air blowing port disposed at an upper end of the rear surface of the housing;

a second fan disposed inside the housing and causing circulation of the air introduced into the first flow path;

a fan housing disposed at a front side of a bottom surface of the housing to support the second fan; and a reflector for reflecting light of the light source toward the glass in the housing, wherein the second part is disposed below the first part, the first fan is disposed in parallel with the bottom surface of the body part, and the body part guides air introduced from an opening into the first part, wherein the fan housing sucks in air through a first opening formed in a direction toward a rear surface and discharges air through a second opening formed in a direction toward an upper surface, and wherein an inlet for discharging air from the first flow path into the housing is disposed ahead of the reflector.

2. The vehicular lamp claim 1, comprising:
a sensor comprising an internal sensing part configured to sense at least one of temperature and humidity in the housing; and a controller configured to control a polarity of an electric signal provided to the thermoelectric element unit based on a result of detection by the sensor.

3. The vehicular lamp of claim 2,
wherein a sensor comprises an external sensing part configured to obtain at least one of external temperature and external humidity of the housing, and
wherein the controller is configured to control an operation of the thermoelectric element unit by comparing a detection result of the internal sensing part and an obtained result of the external sensing part.

4. The vehicular lamp of claim 3, wherein the controller is configured to receive at least one information on external temperature and external humidity from a processor of a vehicle with the vehicular lamp mounted thereon, and to control an operation of the thermoelectric element unit by comparing the detection result of the sensor.

5. The vehicular lamp of claim 1, wherein the first flow path has a shape of a cross-sectional area increasing in a direction toward the glass so that one of the cold wind and the hot wind circulates by convection in the housing along an inner side surface of the glass.

6. The vehicular lamp of claim 5, wherein the second flow path is formed to discharge the other one of the cold wind and the hot wind to a direction external to the glass.

7. The vehicular lamp of claim 5, wherein the second flow path is formed to discharge the other one of the cold wind and the hot wind to a direction toward the rear surface of the housing.

8. The vehicular lamp of claim 1, wherein the thermoelectric element unit comprises a plurality of pins that come into contact with the first part and the second part.

9. The vehicular lamp of claim 1, wherein the thermoelectric element unit comprises an insulation material disposed at side surfaces of the first part and the second part.

* * * * *